(12) United States Patent
Olarig et al.

(10) Patent No.: US 10,824,348 B2
(45) Date of Patent: Nov. 3, 2020

(54) METHOD OF EXECUTING CONDITIONAL DATA SCRUBBING INSIDE A SMART STORAGE DEVICE

(71) Applicant: Samsung Electronics Co., Ltd., Suwon-si, Gyeonggi-do (KR)

(72) Inventors: Sompong Paul Olarig, Pleasanton, CA (US); Mu-Tien Chang, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 61 days.

(21) Appl. No.: 15/275,337

(22) Filed: Sep. 23, 2016

(65) Prior Publication Data

US 2018/0039437 A1 Feb. 8, 2018

Related U.S. Application Data

(60) Provisional application No. 62/370,230, filed on Aug. 2, 2016.

(51) Int. Cl.
*G06F 3/06* (2006.01)
*G06F 21/60* (2013.01)
(Continued)

(52) U.S. Cl.
CPC .......... *G06F 3/0622* (2013.01); *G06F 3/0637* (2013.01); *G06F 3/0652* (2013.01);
(Continued)

(58) Field of Classification Search
CPC .... G06F 3/0622; G06F 3/0637; G06F 3/0652; G06F 21/6218; G06F 21/602;
(Continued)

(56) References Cited

U.S. PATENT DOCUMENTS

| 8,516,271 | B2 | 8/2013 | Faraboschi et al. | |
| 2003/0144804 | A1* | 7/2003 | Floro | G06F 1/30 702/63 |

(Continued)

FOREIGN PATENT DOCUMENTS

WO 2015016918 A1 2/2015

OTHER PUBLICATIONS

Imation, Access Standard User Guide, Copy right 2011 Imation Corp, entire pages (Year: 2011).*

(Continued)

*Primary Examiner* — Hong C Kim
(74) *Attorney, Agent, or Firm* — Renaissance IP Law Group LLP

(57) ABSTRACT

A secure memory (145) is disclosed. The memory (145) may include data storage (310, 315, 320, 325, 330, 335, 340, 345) for data, along with a data read logic (405) and a data write logic (410) to read and write data from the data storage (310, 315, 320, 325, 330, 335, 340, 345). A password storage (355) may store a stored password (510). A receiver may receive a received password (505) from a memory controller (205). A comparator may compare the received password (505) with the stored password (510). An erase logic (435) may erase data in the data storage (310, 315, 320, 325, 330, 335, 340, 345) if the received password (505) does not match the stored password (510). Finally, a block logic (425) may block access to the memory (145) from the memory controller (205) until after the comparator (430) completes its operation.

31 Claims, 14 Drawing Sheets

(51) Int. Cl.
*G06F 21/62* (2013.01)
*G06F 21/79* (2013.01)

(52) U.S. Cl.
CPC .......... *G06F 3/0679* (2013.01); *G06F 21/602* (2013.01); *G06F 21/6218* (2013.01); *G06F 21/79* (2013.01); *G06F 2221/2143* (2013.01)

(58) Field of Classification Search
CPC .... G06F 21/79; G06F 3/0679; G06F 12/1466; G06F 12/1458; G06F 21/31; G06F 2212/1052; G06F 12/1425; G06F 21/45; G06F 21/62; G06F 2221/2143; G06F 12/1416; H04L 9/0891; H04L 9/0894; H04L 63/083; H04L 63/10
USPC ........................ 711/164; 713/183; 726/17, 26
See application file for complete search history.

(56) References Cited

U.S. PATENT DOCUMENTS

| | | | | |
|---|---|---|---|---|
| 2004/0268074 | A1* | 12/2004 | Yagi | G06F 21/78 711/164 |
| 2008/0195830 | A1* | 8/2008 | Lee | G06F 12/1458 711/164 |
| 2008/0301817 | A1* | 12/2008 | Yoshida | G06F 21/31 726/26 |
| 2010/0024028 | A1* | 1/2010 | Baugher | G06F 21/62 726/17 |
| 2010/0075517 | A1* | 3/2010 | Ni | G06K 19/07732 439/131 |
| 2010/0088527 | A1* | 4/2010 | Johnson | A63F 13/98 713/193 |
| 2011/0099317 | A1* | 4/2011 | Nishtala | G06F 13/385 710/316 |
| 2013/0061315 | A1* | 3/2013 | Jevans | G06F 12/1466 726/17 |
| 2014/0082260 | A1* | 3/2014 | Oh | G06F 13/1668 711/103 |
| 2014/0289488 | A1* | 9/2014 | Connolly | G06F 12/1466 711/163 |
| 2014/0337592 | A1* | 11/2014 | Jevans | G06F 11/1456 711/162 |
| 2015/0121537 | A1* | 4/2015 | Ellis | G06F 21/60 726/26 |
| 2015/0294698 | A1* | 10/2015 | Takefman | G11C 5/04 365/189.05 |
| 2016/0092377 | A1 | 3/2016 | Sauer | |
| 2017/0110207 | A1* | 4/2017 | Jung | G11C 29/70 |

OTHER PUBLICATIONS

SanDisk Secure Access Quick Start Guide 2011 SanDisk Corporation pp. 1-14 (Year: 2011).*

Imation, Imation Lock User Manual, Security Application Program V2.0-D, 2009, entire pages.*

Imation, Imation Clip USB 2.0 Flash Drive Imation Drive Manager Software, User's Manual, 2006, entire pages.*

Toshiba, Toshiba SD Card Specification, Dec. 29, 2006, pp. 1-64 (Year: 2006).*

BitLocker to Go—for Portable USB Drives, May 28, 2016 pp. 1-22 http://kb.mit.edu/confluence/display/istcontrib/BitLocker+To+Go+-+for+Portable+USB+Drives (Year: 2016).*

* cited by examiner

METHOD OF EXECUTING CONDITIONAL DATA SCRUBBING INSIDE A SMART STORAGE DEVICE

RELATED APPLICATION DATA

This application claims the benefit of U.S. Provisional Patent Application Ser. No. 62/370,230, filed Aug. 2, 2016, which is incorporated by reference herein for all purposes.

FIELD

The inventive concepts relate generally to memory, and more particularly to memory that may be secured to prevent unauthorized access to data stored in the memory.

BACKGROUND

The contents of non-volatile memories (NVMs) are persistent. When used as a long term storage device, this behavior is expected and intended: the preservation of data is desired.

But the use of non-volatile memories in the memory space may present problems. Many forms of data kept in the memory space are intended to be transient, often for security reasons. NVMs break this assumption and pose a risk if the NVM is ever stolen or its resources re-allocated. For example, a cloud-based web service may store customer data on what it assumes to be volatile memory, when in fact the data is stored on a NVM. If the web-service is terminated without expressly wiping the memory contents, then that data could be obtained by another user as if the NVM is stolen, or the NVM's resources are given to another cloud user, for instance.

A need remains for a way for memory to be secured to prevent unauthorized access to memory modules, particularly memory modules that utilize NVM.

DETAILED DESCRIPTION

Figure 1:
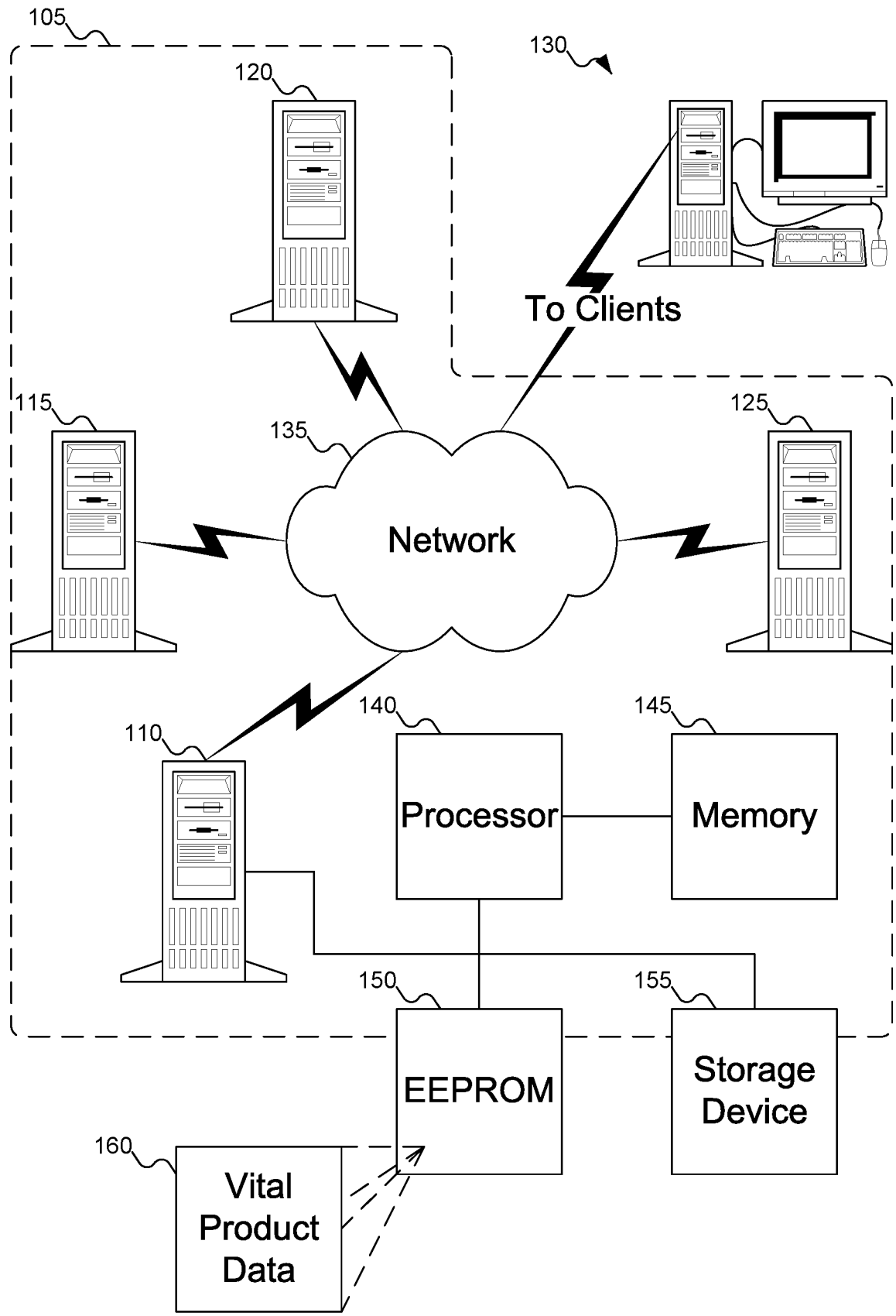
FIG. 1 shows a data center with various host machines using secure memory, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

A secure non-volatile memory (NVM) module may be used in a memory space. The NVM may be equipped with a password and an authentication logic: data from the NVM may only be accessed if the user has the matching key.

The control flow for the secure module may proceed as follows:

1) A memory controller reads the Serial Presence Detect (SPD) of a Dual In-Line Memory Module (DIMM) SPD at reset (either a hardware-induced reset, such as power-up, or a software-induced reset) to determine if the DIMM has a secure mode.

2) If the DIMM does not have a secure mode, then the system proceeds as normal.

3) Otherwise, the memory controller sends a password to the DIMM, via a newly defined Mode Register Set (MRS) command.

4) If the password is recognized, the DIMM is unlocked and the DIMM proceeds as a regular DIMM. The DIMM may send a signal to the memory controller, granting access to the memory controller. The "authentication" signal may be delivered via the DQ bus. The system may then proceed as normal.

5) If the password is not recognized, the DIMM may ask the memory controller to retry. The retry signal may also be sent over the DQ bus. The memory controller may then resend the key also via the MRS command.

6) If the number of retries exceeds a threshold, the DIMM may stop allowing the memory controller to retry. Instead, the DIMM may send an "unauthorized" signal via the DQ bus to the memory controller. The DIMM may then erase its contents before granting the memory controller access to the DIMM.

FIG. 1 shows a data center with various host machines using secure memory, according to an embodiment of the inventive concept. In FIG. 1, data center 105 may include various host machines (which may also be called servers), such as host machines 110, 115, 120, and 125. Data center 105 may support client machines, such as client machine 130, which may be used by any user. Users on client machine 130 may effectively "lease" resources from data center 105 for whatever services are needed. For example, data center 105 might offer a user the ability to purchase products that may be delivered to his or her home; data center 105 may "lease" memory to the user to store the user's shopping cart while selecting their purchases and completing payment. While FIG. 1 shows data center 105 including four host machines 110, 115, 120, and 125 and one client machine 130, embodiments of the inventive concept may support any number of host machines and/or client machines. As host machines 110, 115, 120, and 125 are interchangeable for purposes of this disclosure, further references to host machine 110 are intended to also include references to host machines 115, 120, and 125.

FIG. 1 shows data center 105 including network 135. Network 135 may take any desired form, including a Local Area Network (LAN), Wide Area Network (WAN), a global network such as the Internet, a wired or wireless network. In addition, network 135 may be a combination of any of these networks, permitting data center 105 to be distributed rather than located in a single geographic location.

FIG. 1 also shows details of host machine 110, although the same details may be found within any of host machines 110, 115, 120, and 125 within data center 105. Host machine 110 is shown as including processor 140, memory 145, Electronically Erasable Programmable Read Only Memory (EEPROM) 150, and storage device 155. Processor 140 may be any variety of processor: for example, an Intel Xeon, Celeron, Itanium, or Atom processor, an AMD Opteron processor, an ARM processor, etc. Memory 145 may be any variety of memory, such as Dynamic Random Access Memory (DRAM), Persistent Random Access Memory (PRAM), Static Random Access Memory (SRAM), Ferroelectric Random Access Memory (FRAM), or Non-Volatile Random Access Memory (NVRAM), such as Magnetoresistive Random Access Memory (MRAM). In addition, memory 145 may be a hybrid memory, including any desired combination of volatile and non-volatile memory devices in a single memory module. But in contrast with conventional memory modules, memory 145 may be a secure memory module, as described below. Storage device may be any variety of storage device, including conventional hard disk drives or flash memory, among other possibilities.

EEPROM 150 may store Vital Product Data (VPD) 160. Although memory 145, as described below, may itself specify whether memory 145 is a secure memory or not, Vital Product Data 160 may provide an alternate source for this information. While FIG. 1 shows Vital Product Data 160 as being stored within EEPROM 150, embodiments of the inventive concept may support using any alternative storage mediums. For example, EEPROM 150 may be replaced with an Erasable Programmable Read Only Memory (EPROM) or flash memory, to name a few alternatives.

Figure 2:
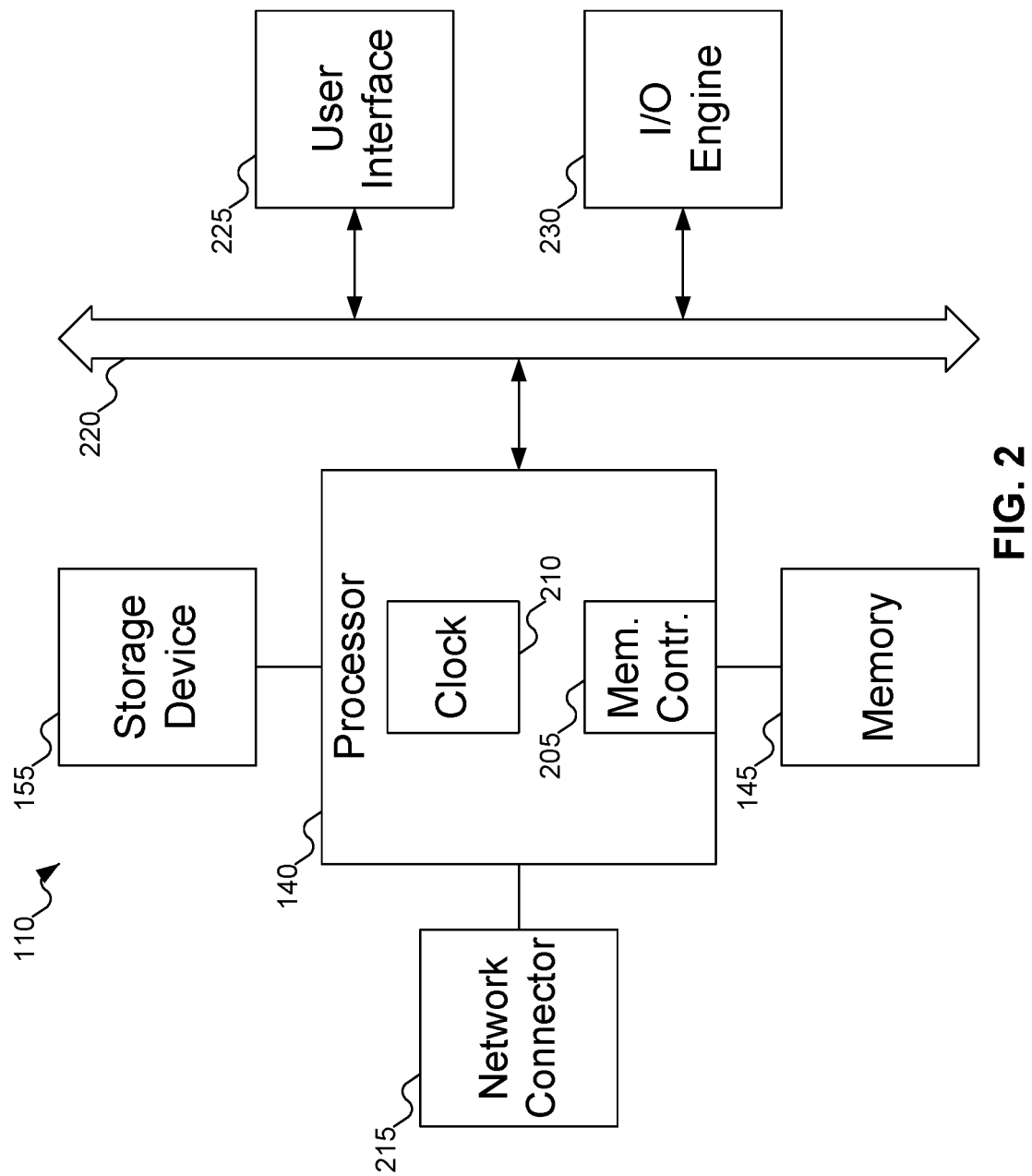
FIG. 2 shows additional details of the host machines of FIG. 1.

FIG. 2 shows additional details of host machines 110, 115, 120, and 125 of FIG. 1. Referring to FIG. 2, typically, host machines 110, 115, 120, and 125 include one or more processors 140, which may include memory controller 205 and clock 210, which may be used to coordinate the operations of the components of host machines 110, 115, 120, and 125. Processors 140 may also be coupled to memory 145, which may include random access memory (RAM), read-only memory (ROM), or other state preserving media, as examples. Processors 140 may also be coupled to storage devices 155, and to network connector 215, which may be, for example, an Ethernet connector or a wireless connector. Processors 140 may also be connected to a bus 220, to which may be attached user interface 225 and input/output interface ports that may be managed using input/output engine 230, among other components.

Figure 3:
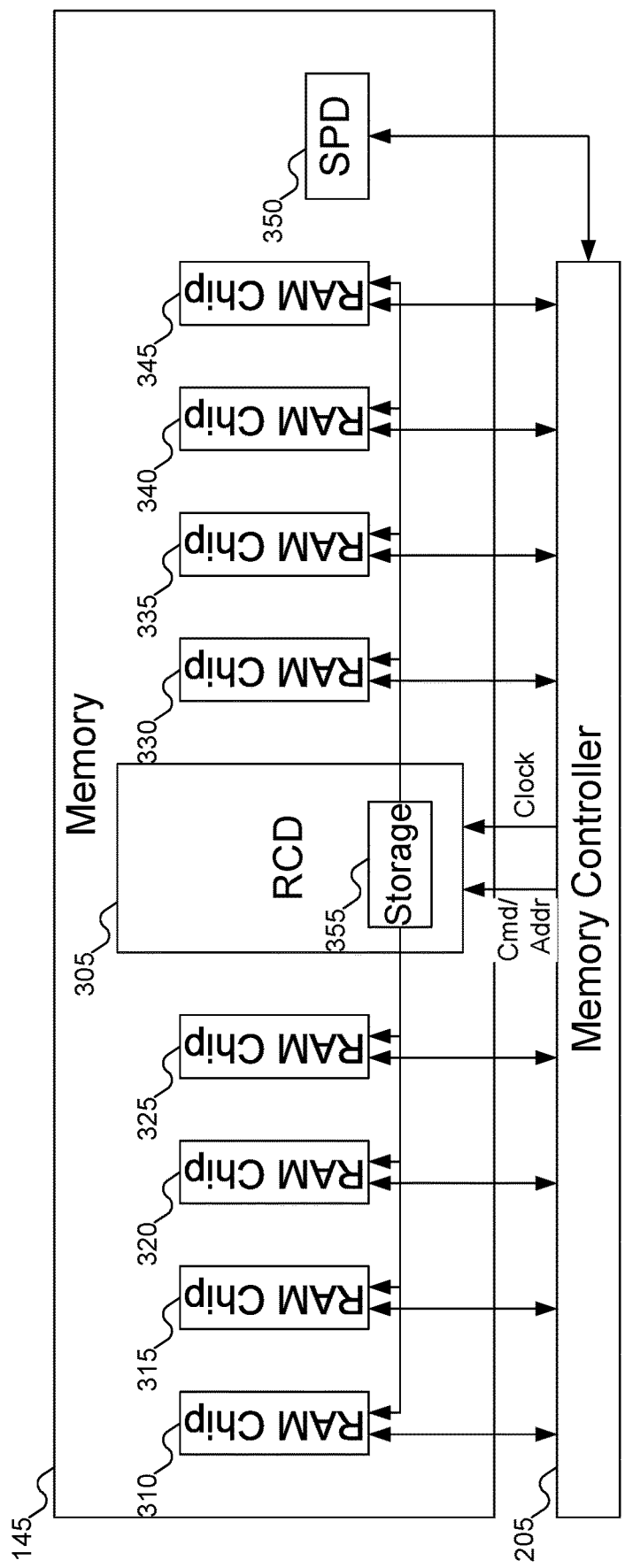
FIG. 3 shows details of the memory of FIG. 1.

FIG. 3 shows details of memory 145 of FIG. 1. In FIG. 3, memory 145 may include register clock driver (RCD) 305 and memory chips 310, 315, 320, 325, 330, 335, 340, and 345. While FIG. 3 shows a typical DRAM module with eight chips to store data, embodiments of the inventive concept may include memory modules of other types and including any desired number of chips or chip alternatives.

Memory controller 205 may interface with memory 145. Memory controller 205 may send commands to read and write data directly to memory chips 310-345. Memory controller 205 may also interface with RCD 305 to using the command/address signals and the clock signals.

After memory 145 has performed a reset operation, memory controller 205 may determine whether memory 145 is operating in secure mode. The reset operation may be either a hardware-induced reset, such as when host machine 110 of FIG. 1 initially powers up or a software-induced reset, such as when memory controller 205 informs memory 145 that a user's lease of resources has ended (described further below). Memory controller 205 may determine whether memory 145 is operating in secure mode by querying Serial Presence Detect (SPD) 350. Alternatively, as described above with reference to FIG. 1, memory controller 205 may access Vital Product Data 160 of FIG. 1 from EEPROM 150, which may indicate whether memory 145 is operating in a secure mode or not.

If memory 145 is not operating in a secure mode, then memory controller 145 may access memory 145 as per conventional practice. But if memory 145 is operating in secure mode, then memory controller 205 may attempt to authenticate to memory 145 to gain access. (Note that in this context, "authenticate to gain access" does not imply that memory controller 205 may be denied access to memory 145, but rather that memory controller 205 might be given access to memory 145 only after memory 145 has erased any previous data, as described below.) Memory controller 205 may send a password to RCD 305 via a Mode Register Set (MRS) command. RCD 305 may then compare the received password with a password stored in storage 355. If the received password matches the stored password, then memory controller 205 may be granted access to memory 145: this signal may be sent via the DQ bus. Otherwise, memory 145 may erase any data stored in memory chips 310-345, after which memory controller 205 may be granted access to memory 145.

To facilitate future access, RCD 305 may also store the received password in storage 355, enabling memory controller 205 to authenticate to memory 145 in the future using the received password. RCD 305 may also overwrite the existing password in storage 355, preventing the older stored password from being accepted in the future. Erasing the stored password may also be part of erasing the data stored in memory 145, again to prevent the older stored password from being accepted in the future.

Memory controller 205 may generate the password in any desired manner. Example approaches may be to generate a random password, to select a password from a predetermined list of passwords, to generate a hash of a user's ID, or to use a Trusted Platform Module (TPM) to generate a password. Embodiments of the inventive concept may also support other techniques to generate passwords.

Embodiments of the inventive concept have several advantages over conventional systems. By providing a mechanism to secure memory 145, the danger of one user being able to read another user's data is significantly reduced. But because the user's data is not encrypted when stored in memory, there is no need for including encryption logic to manage the encrypted data Eliminating the need to encrypt the data also decreases the time required to access data from memory 145, since no time needs to be spent performing encryption/decryption.

A useful analogy for a convention system might be to compare memory with a bank's safe deposit box system. To access something from a safe deposit box in the bank, the key to that box must be presented. If the user then needs access to data in a different box, the first box must be closed and the next box opened. This is similar to a conventional system that encrypts the data: to access any particular piece of data, that data must be decrypted, which slows down access.

In contrast, memory 145 may be compared with a house, and the password used to access memory 145 with a key to the door. Until the door is unlocked, the contents of the house are protected. Once the door is unlocked, the data may be freely accessed without delay: no further delay is incurred, since the data is not encrypted.

Figure 4:
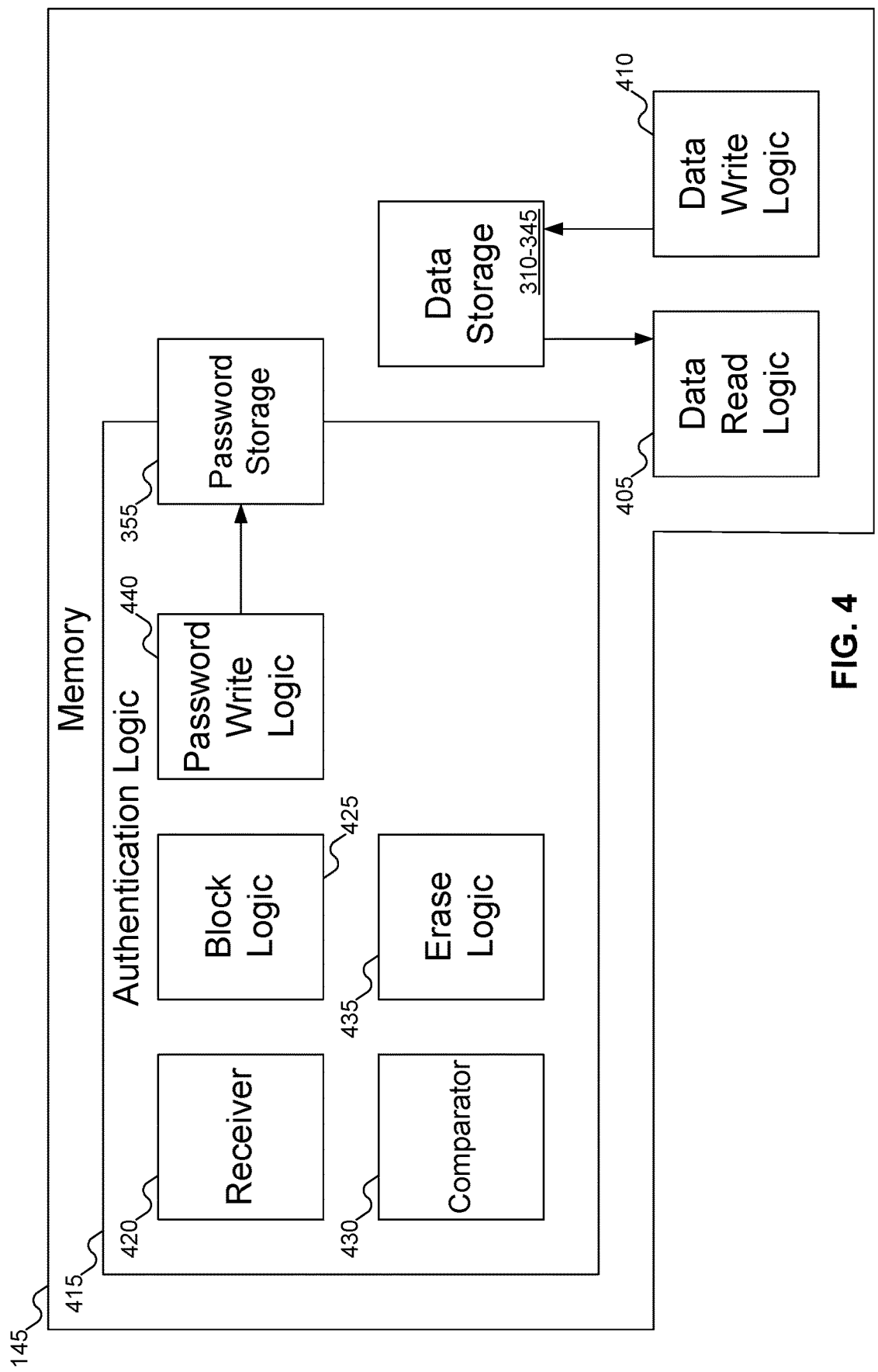
FIG. 4 shows an alternative view of the memory of FIG. 1.

FIG. 4 shows an alternative view of memory 145 of FIG. 1. In contrast with FIG. 3, which shows a particular embodiment of memory 145, FIG. 4 shows a more abstract representation of memory 145. Memory 145 may include data storage 310-345, which may store the actual user data, along with data read logic 405 and data write logic 410, which may read and write data from data storage 310-345.

Memory 145 may also include authentication logic 415, which may determine whether a user is to be granted access to memory 145. As described above, "granted access" does not mean that there is a possibility that the user might not be permitted to use memory 145, but rather that memory 145 might erase any data in data storage 310-345 before the user is granted access. Authentication logic 415 may include receiver 420, block logic 425, comparator 430, and erase logic 435. Receiver 420 may receive a password from memory controller 205 of FIG. 3. Block logic 425 may block access to memory 145 from memory controller 205 of FIG. 3 while authentication logic 415 determines whether data storage 310-345 should be erased before memory controller 205 of FIG. 3 is granted access. Comparator 430 may compare the password received from memory controller 205 of FIG. 3 with a password stored in password storage 355 to see if the passwords match. If they do not match, then erase logic 435 may erase the contents of data storage 310-345 before memory controller 205 of FIG. 3 is granted access to memory 145.

Erase logic 435 may operate in any manner appropriate for the form taken by memory 145. For example, if memory 145 uses only volatile memory, erase logic 435 may effectively erase memory 145 by preventing the refresh of the values in data storage 310-345 long enough that all values stored therein are lost—that is, any values stored in data storage 310-345 are no longer stored. (How long this will take may depend on the specific type and form of data storage 310-345, as well as other factors, such as eccentricities associated with the manufacture of data storage 310-345. For example, if memory 145 uses volatile memory and is in a cold environment, erase logic 435 might need to write values to memory 145 to erase memory 145, as the contents of memory 145 might not be compromised in a reasonable amount of time.) In other embodiments of the inventive concept, erase logic 435 may overwrite all values stored in data storage 310-345 with a constant value, such as 0 or 1, as desired. In yet other embodiments of the inventive concept, erase logic 435 may perform a designed sequence of writes to erase any values. Examples of such sequences may include sequences designed by the U.S. Department of Defense (DoD) or other governmental agencies and non-governmental groups. For example, such a sequence might include writing all zeros, then all ones, then writing a random pattern into memory. In yet another embodiment of the inventive concept, which may be used with flash memory, all of the data blocks in memory 145 (or at least those blocks that contained valid data) may be subject to immediate garbage collection before memory controller 205 of FIG. 3 may be granted access to memory 145.

Authentication logic 415 may also include password write logic 440. Password write logic 440 may write a password to password storage 355. For example, if the password received from memory controller 205 of FIG. 3 does not match the password stored in password storage 355, after erase logic 435 erases the contents of data storage 310-345, password write logic 440 may write the password received from memory controller 205 of FIG. 3 to password storage 355. In that manner, memory controller 205 of FIG. 3 may later authenticate to memory 145 using the same password, any other memory controllers will not be able to authenticate (barring the unlikely event that the other memory controllers manage to produce the same password), thereby protecting the user's data from unauthorized access.

In FIGS. 3-4, it is up to the system to determine when to reset memory 145. That is, memory 145 does not know for how long any particular user has leased memory 145. So, memory controller 205 of FIG. 3, or the service provider of data center 105 of FIG. 1) may track how long the user has had access to memory 145 via a timer. Once the user's lease has expired, memory controller 205 of FIG. 3 (or any other desired component of host machine 110 of FIG. 1) may issue a software-induced reset instruction to memory 145 (or more generally, to server 110 of FIG. 1), which may protect the user's data from being read by another user.

In FIGS. 3-4, password storage 355 is shown as separate from SPD 350. But some embodiments of the inventive concept may store passwords in an unused portion or a vendor-specified area of SPD 350, if desired. Such an approach may avoid introducing a new storage just for passwords.

Figure 5:
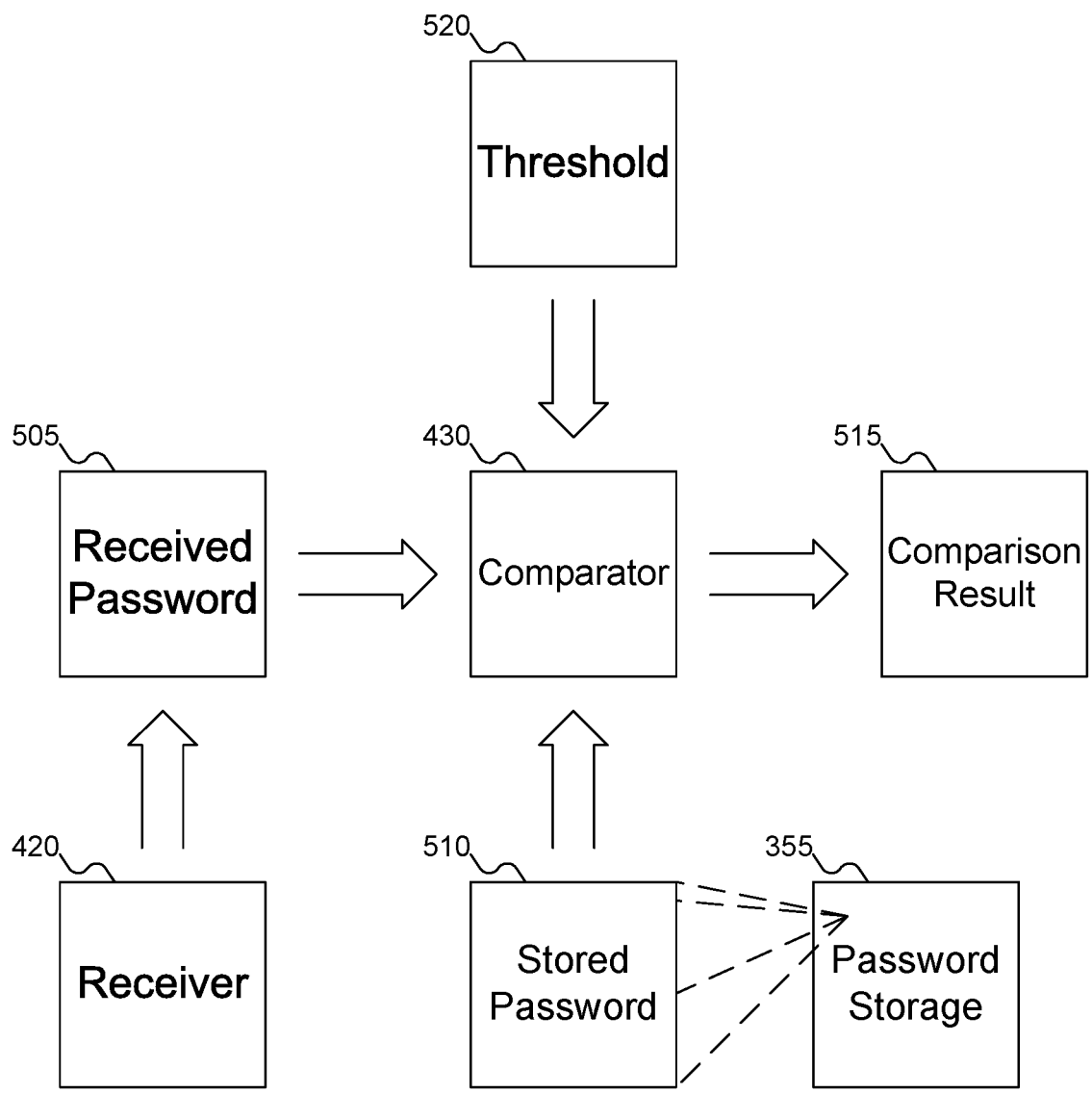
FIG. 5 shows the memory of FIGS. 3-4 using a password received from the memory controller of FIG. 3 to determine whether to grant access to data stored in the memory of FIGS. 3-4 or to erase the data stored in the memory of FIGS. 3-4.

FIG. 5 shows memory 145 of FIGS. 3-4 using a password received from memory controller 205 of FIG. 3 to determine whether to grant access to data stored in memory 145 of FIGS. 3-4 or to erase the data stored in memory 145 of FIGS. 3-4. In FIG. 4, receiver 420 may receive password 505 from memory controller 205 of FIG. 3. Comparator 430 may then compare received password 505 with stored password 510, which may be retrieved from password storage 355. If received password 505 matches stored password 510, then result 515 may indicate that memory controller 205 of FIG. 3 may be granted immediate access to memory 145 of FIG. 4; otherwise, result 515 may indicate that memory controller 205 of FIG. 3 should be blocked until after the data in data storage 310-345 of FIGS. 3-4 have been erased by erase logic 435 of FIG. 4.

FIG. 5 also shows the use of threshold 520. In some embodiments of the inventive concept, comparator 430 may perform a single comparison of received password 505 and stored password 510 to determine whether or not to grant memory controller 205 of FIG. 3 access to memory 145 of FIGS. 3-4. But other embodiments of the inventive concept may permit memory controller 205 of FIG. 3 to provide multiple received passwords 505. For example, after comparator 430 determines that received password 505 does not match stored password 510, authentication logic 415 of FIG. 4 may send a signal via the DQ bus to memory controller 205 of FIG. 3, requesting that memory controller 205 of FIG. 3 resend received password 505. Permitting retries may protect against unexpected changes in data: for example, due to interference when received password 505 is sent. Comparator 430 may then test received passwords 505 as many times as specified by threshold 520, after which, if no match has been found, result 515 may specify to erase the data from data storage 310-345 of FIGS. 3-4 in memory 145 of FIGS. 3-4. Threshold 520 may be set to any desired integer value; but since memory controller 205 of FIG. 3 is temporarily blocked from accessing memory 145 of FIGS. 3-4 until embodiments of the inventive concept have determined whether or not to erase the data in data storage 310-345 of FIGS. 3-4 (and performed that erase, if needed), it may be advantageous to keep threshold 520 to a lower integer value, to reduce the time during which memory controller 205 of FIGS. 3-4 is blocked.

Figure 6:
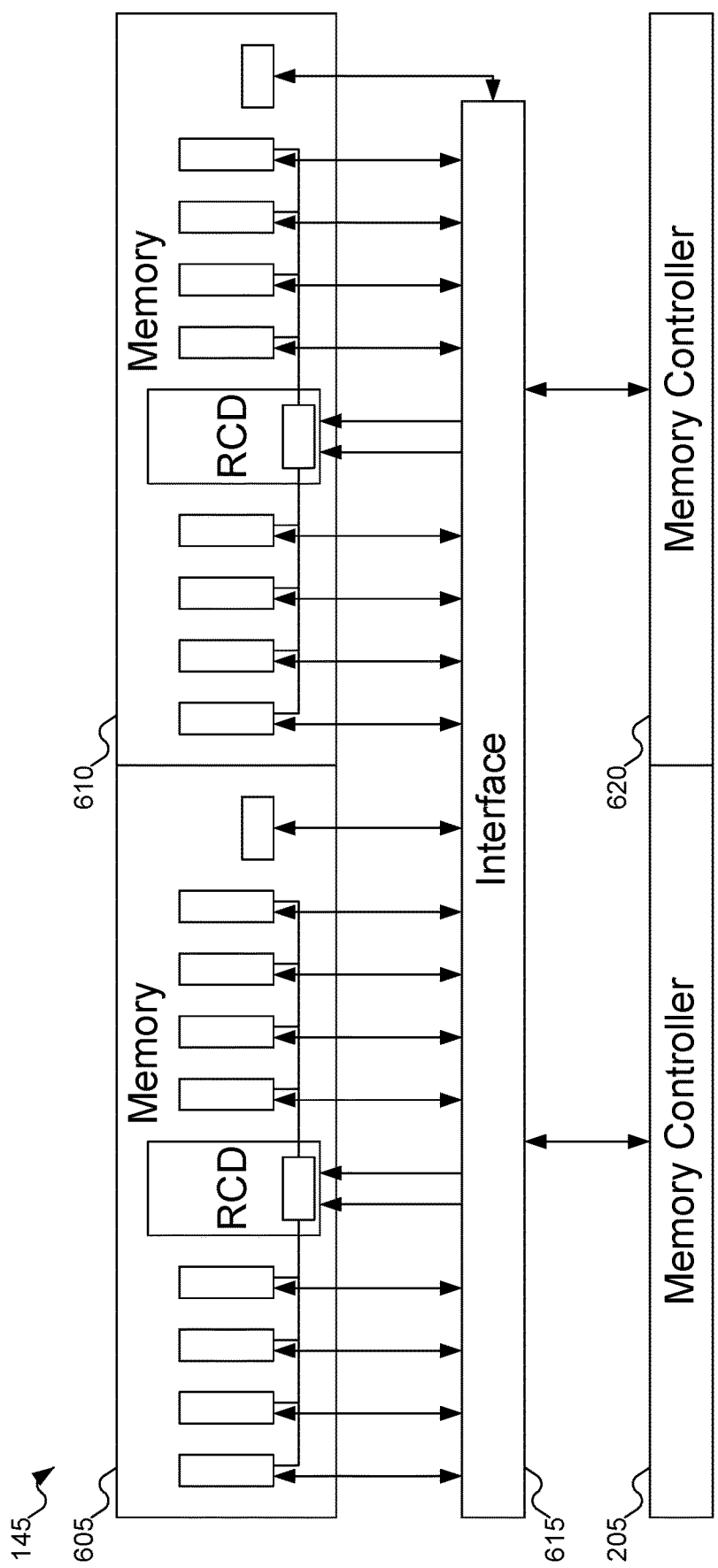
FIG. 6 shows an example of the memory of FIG. 1 that may share resources between two users, according to an embodiment of the inventive concept.

FIG. 6 shows an example of memory 145 of FIG. 1 that may share resources between two users, according to an embodiment of the inventive concept. In FIG. 6, memory 145 may include two portions 605 and 610 of memory, each of which may be treated as a separate memory module. For example, memory 145 might be a DIMM with a capacity measured in terabytes or larger. As this amount of memory might be more than a single user needs, allocating the entirety of memory 145 to a single user would be wasteful. Instead, a portion of memory 145, such as portion 605, may be allocated to the user, leaving portion 610 available for other uses, including another user.

Using interface 615, two memory controllers 205 and 620 may interface with memory 145. For example, memory controller 205 may interface with portion 605 of memory 145, and memory controller 620 may interface with portion 610 of memory 145. In this manner, although memory 145 may store data for two different users, each user may only access their data, and not the other user's data. This mechanism protects the data of each.

When one user's lease of their portion of memory 145 ends, a software-induced reset of memory 145 may be initiated. For example, assume that the user who has leased portion 605 has ended their lease. Memory 145 may then be reset. When the software-induced reset of memory 145 completes, memory controller 620 may present its password to memory 145. Memory controller 620 may thus authenticate itself back to memory 145, regaining access to the user's data stored in portion 610. While it is true that the software-induced reset and authentication process may delay access to the user's data in portion 610, this delay is not significant, and would likely not even be noticed by the user.

Memory controller 205, on the other hand, may present a new password to memory 145. Because this password will (likely) not be recognized, memory controller 205 will not be able to authenticate to memory 145. Thus, portion 605 may be erased before another user may lease portion 605, protecting the user whose data was previously stored in portion 605.

While FIG. 6 shows memory 145 divided into two portions 605 and 610, embodiments of the inventive concept may support any number of portions in memory 145. The use of two portions in FIG. 6 is merely an example. In addition, depending on the embodiment of memory 145, memory 145 might include one RCD for each portion of memory 145, one RCD for all portions of memory 145, or no RCD at all.

Figure 7A:
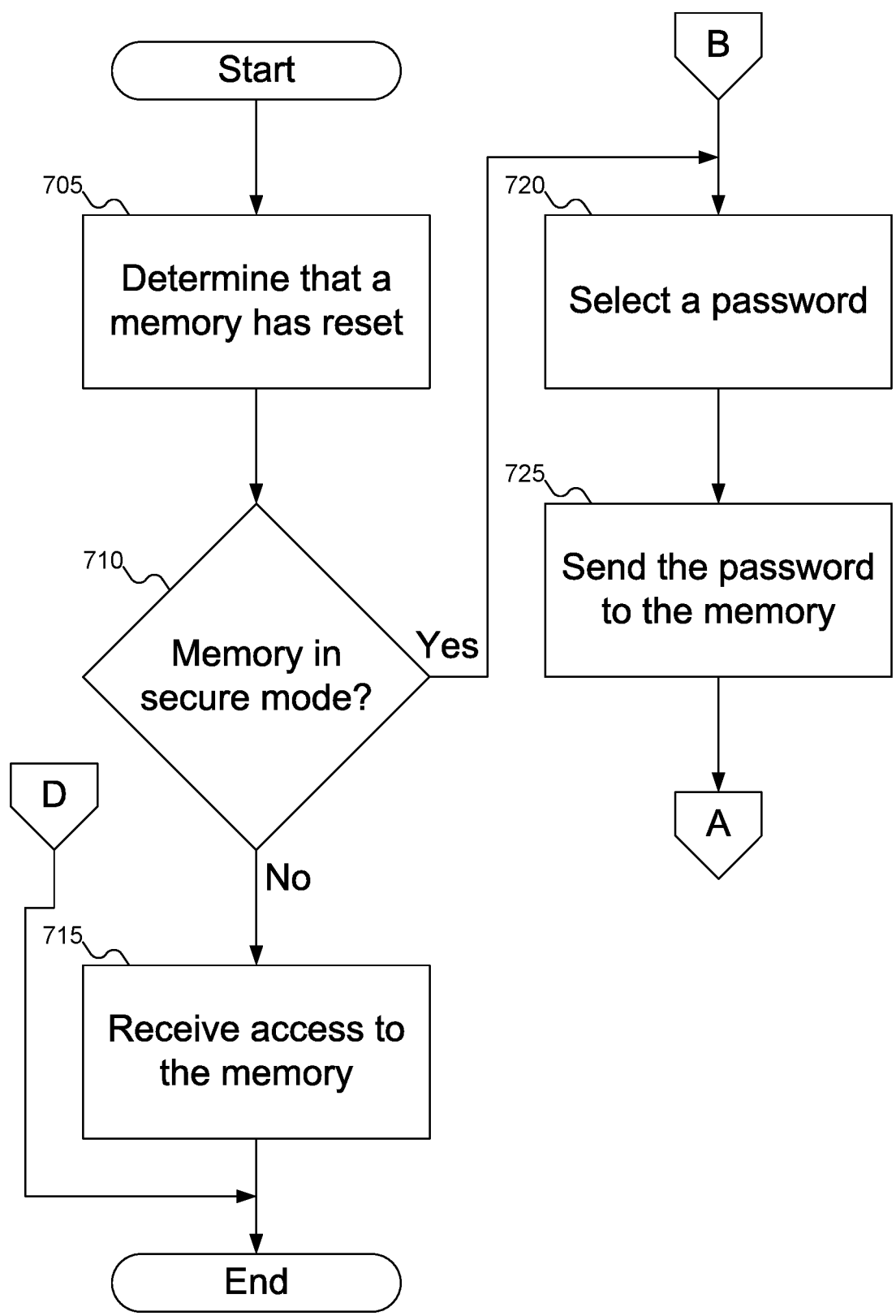
FIGS. 7A-7C show a flowchart of an example procedure for the memory controller of FIG. 3 to request access to the memory of FIG. 1, according to an embodiment of the inventive concept.
Figure 7B:
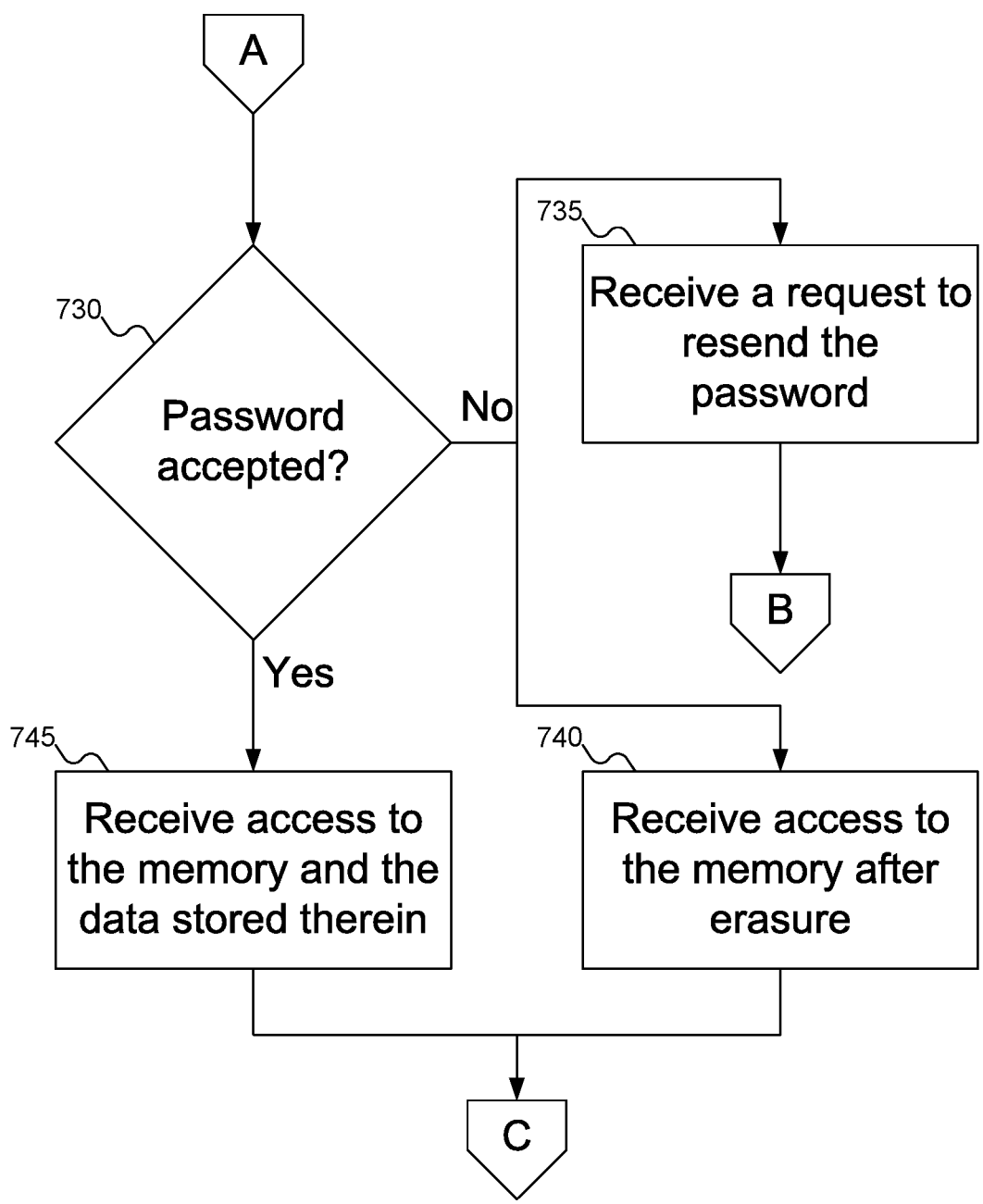
Figure 7C:
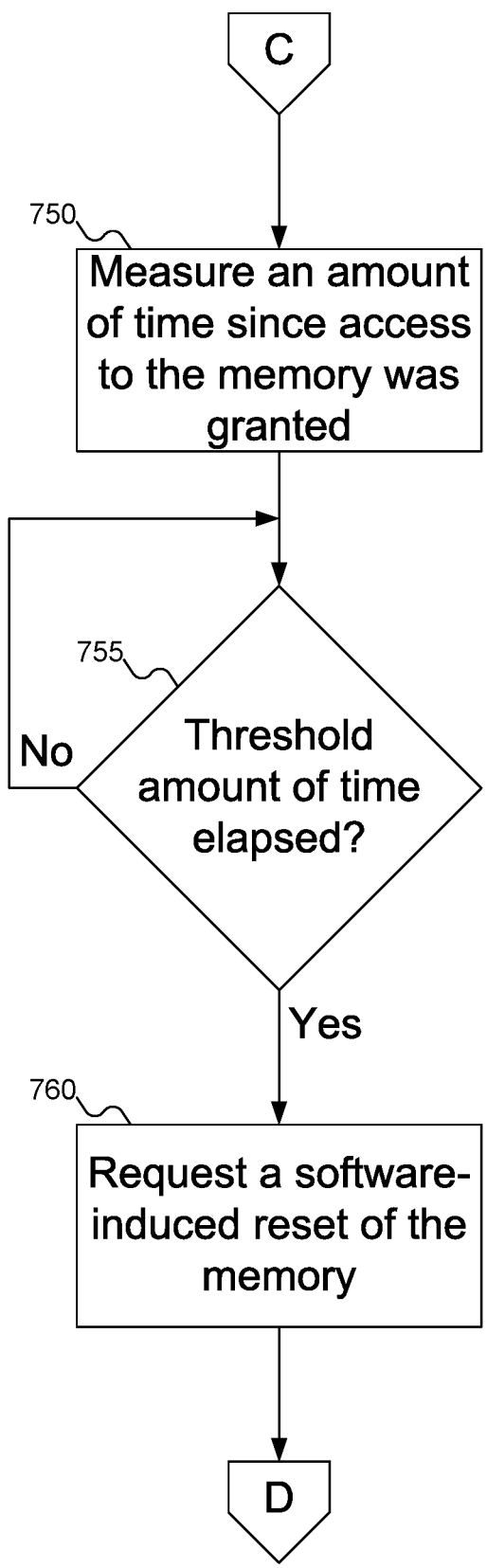

FIGS. 7A-7C show a flowchart of an example procedure for memory controller 205 of FIG. 3 to request access to memory 145 of FIG. 1, according to an embodiment of the inventive concept. In FIG. 7A, at block 705, memory controller 205 of FIG. 3 may determine that memory 145 of FIG. 1 has reset (either via a hardware-induced reset or a software-induced reset). At block 710, memory controller 205 may determine whether memory 145 of FIG. 1 is operating in secure mode or not: for example, by reading pertinent data from SPD 350 of FIG. 3. At block 715, if memory 145 of FIG. 1 is not operating in secure mode, then memory controller 205 of FIG. 3 may receive access to memory 145 of FIG. 1.

On the other hand, if memory 145 of FIG. 1 is operating in secure mode, then at block 720, memory controller 205 of FIG. 3 may select a password for use with memory 145 of FIG. 1. At block 725, responsive to a request from memory 145 of FIG. 1, memory controller 205 of FIG. 3 may send the password to memory 145 of FIG. 1.

At block 730 (FIG. 7B), memory controller 205 of FIG. 3 may determine whether the password was accepted. As described above, memory 145 of FIG. 1 may send a signal via the DQ bus to indicate whether the password was accepted and memory controller 205 of FIG. 3 was authorized. If the password was not accepted, then at block 735, memory controller 205 of FIG. 3 may receive a request to resend the password, and control may return to block 720 of FIG. 7A. Alternatively, at block 740, memory controller 205 of FIG. 3 may receive access to memory 145 of FIG. 1, but only after memory 145 of FIG. 1 has erased all data in data storage 310-345 of FIGS. 3-4. The difference between blocks 735 and 740 represents whether or not memory 145 has performed a threshold number of password comparisons: since memory controller 205 of FIG. 3 might not know the threshold value, memory controller 205 of FIG. 3 might only be able to respond to additional password requests is made by memory 145 of FIG. 1.

On the other hand, if the password is accepted, then at block 745 memory controller 205 of FIG. 3 may receive access to memory 145 of FIG. 1, without the data in data storage 310-345 of FIGS. 3-4 being erased first.

At block 750 (FIG. 7C), memory controller 205 of FIG. 3 may measure how long it has been since memory controller 205 of FIG. 3 was granted access to memory 145 of FIG. 1. At block 755, memory controller 205 of FIG. 3 may determine whether a threshold amount of time—the amount of time for which the user leased memory 145 of FIG. 1—has passed. If not, then memory controller 205 of FIG. 3 may wait a little while and measure again how much time has passed. Once the leased time has passed, at block 760, memory controller 205 of FIG. 3 may instruct memory 145 of FIG. 1 to perform a software-induced reset, after which processing ends.

Figure 8:
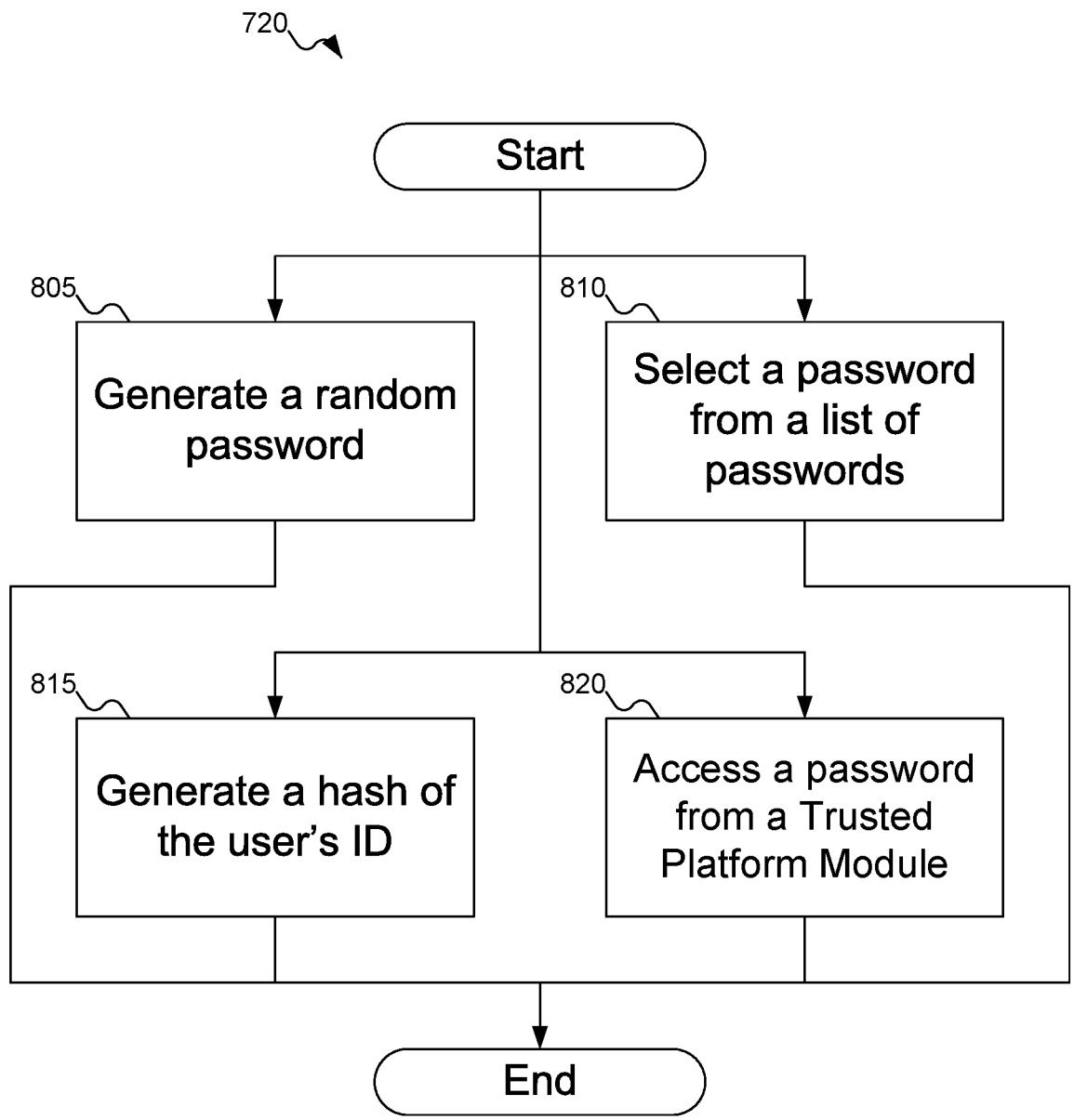
FIG. 8 shows a flowchart of an example procedure for the memory controller of FIG. 3 to select a password to request access to the memory of FIG. 1, according to an embodiment of the inventive concept.

FIG. 8 shows a flowchart of an example procedure for memory controller 205 of FIG. 3 to select a password to request access to memory 145 of FIG. 1, according to an embodiment of the inventive concept. In FIG. 8, at block 805, memory controller 205 of FIG. 3 may generate a random password to use in authentication to memory 145 of FIG. 1. Alternatively, at block 810, memory controller 205 of FIG. 3 may select a password from a list of passwords to use in authentication to memory 145 of FIG. 1. Alternatively, at block 815, memory controller 205 of FIG. 3 may hash a user ID to generate a password to use in authentication to memory 145 of FIG. 1. Alternatively, at block 820, memory controller 205 of FIG. 3 may access a password from a Trusted Platform Module to use in authentication to memory 145 of FIG. 1.

Figure 9A:
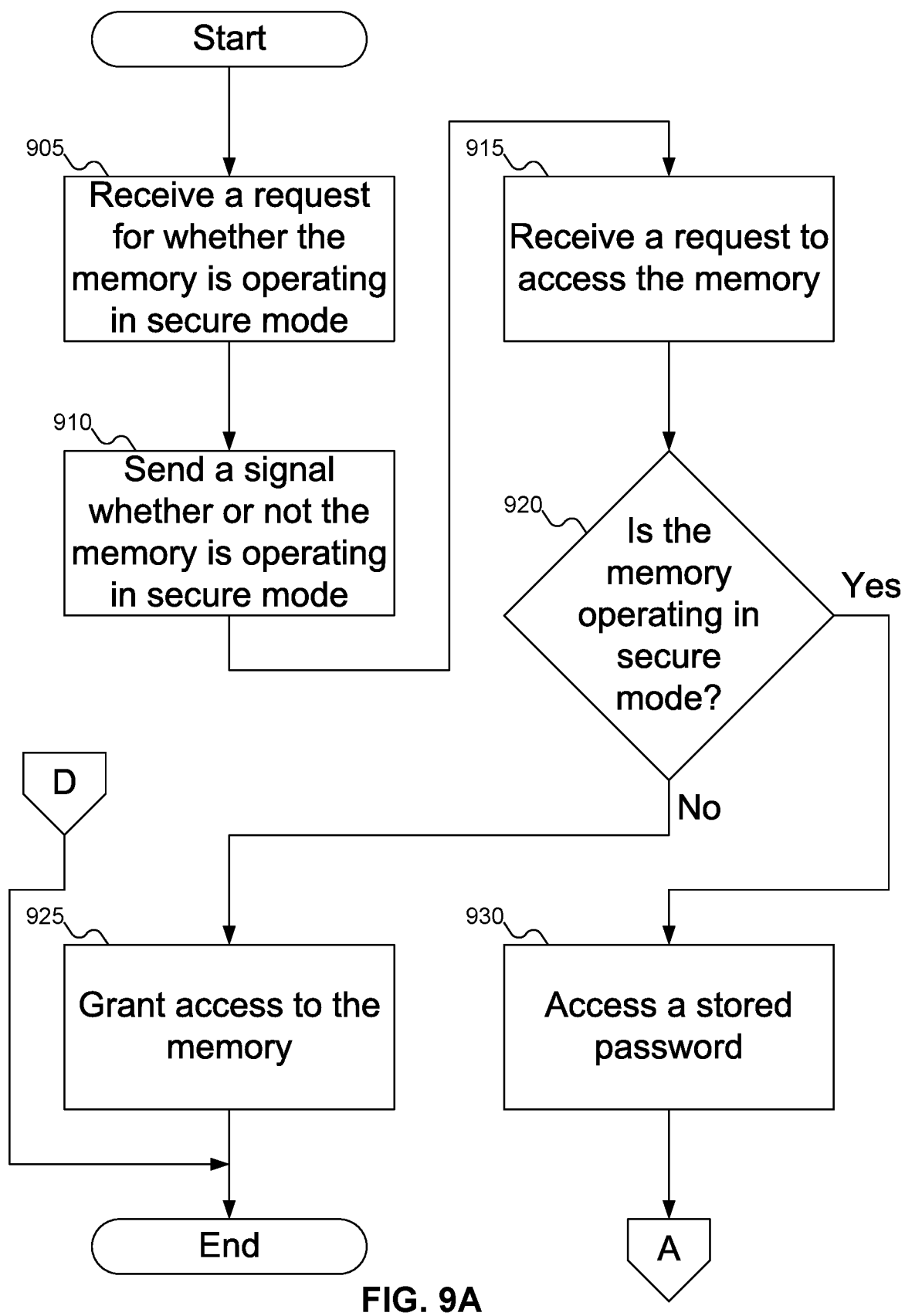
FIGS. 9A-9C show a flowchart of an example procedure for the memory of FIG. 1 to determine whether to grant the memory controller of FIG. 3 access to data or to erase the data, according to an embodiment of the inventive concept.
Figure 9B:
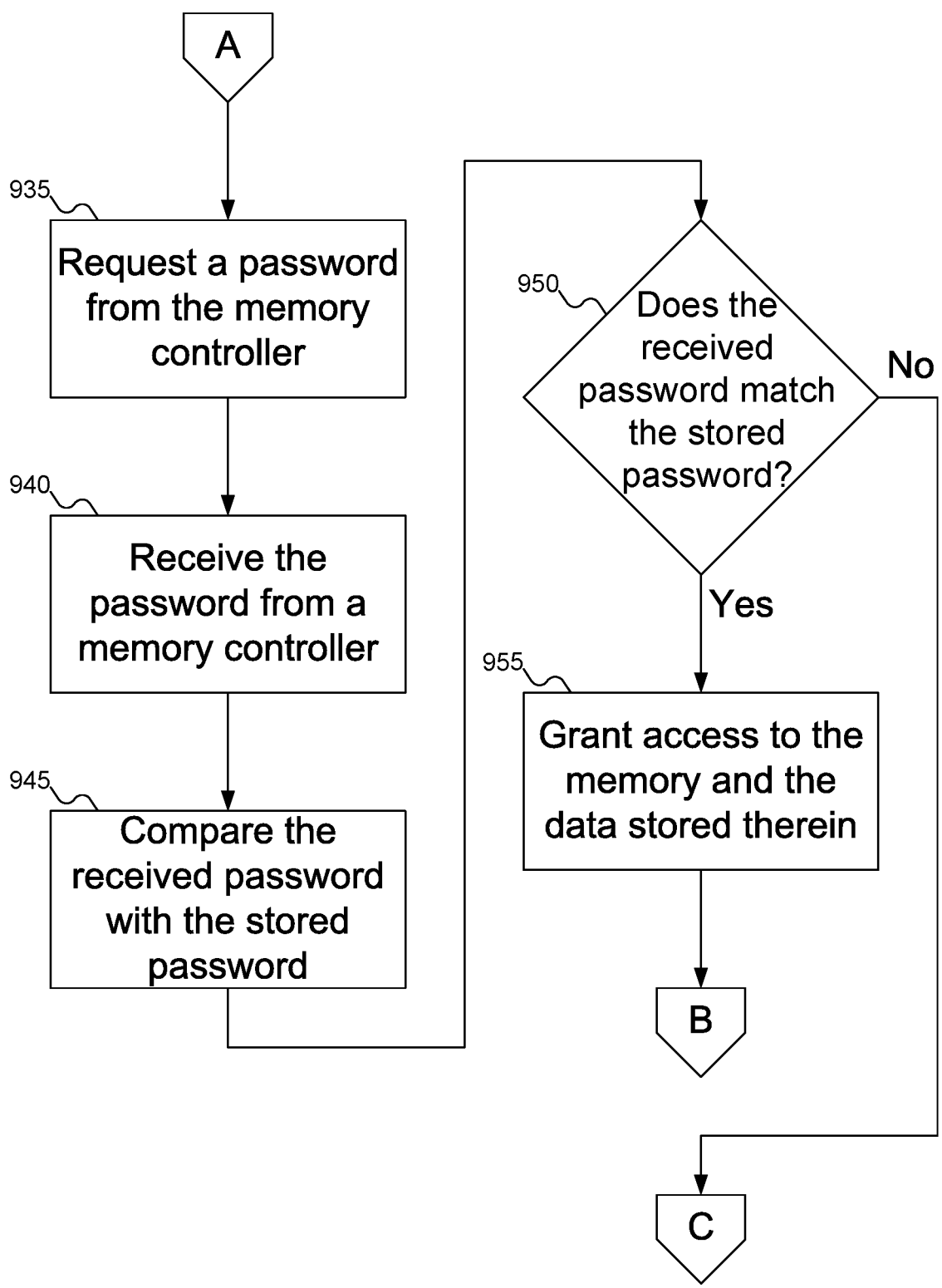
Figure 9C:
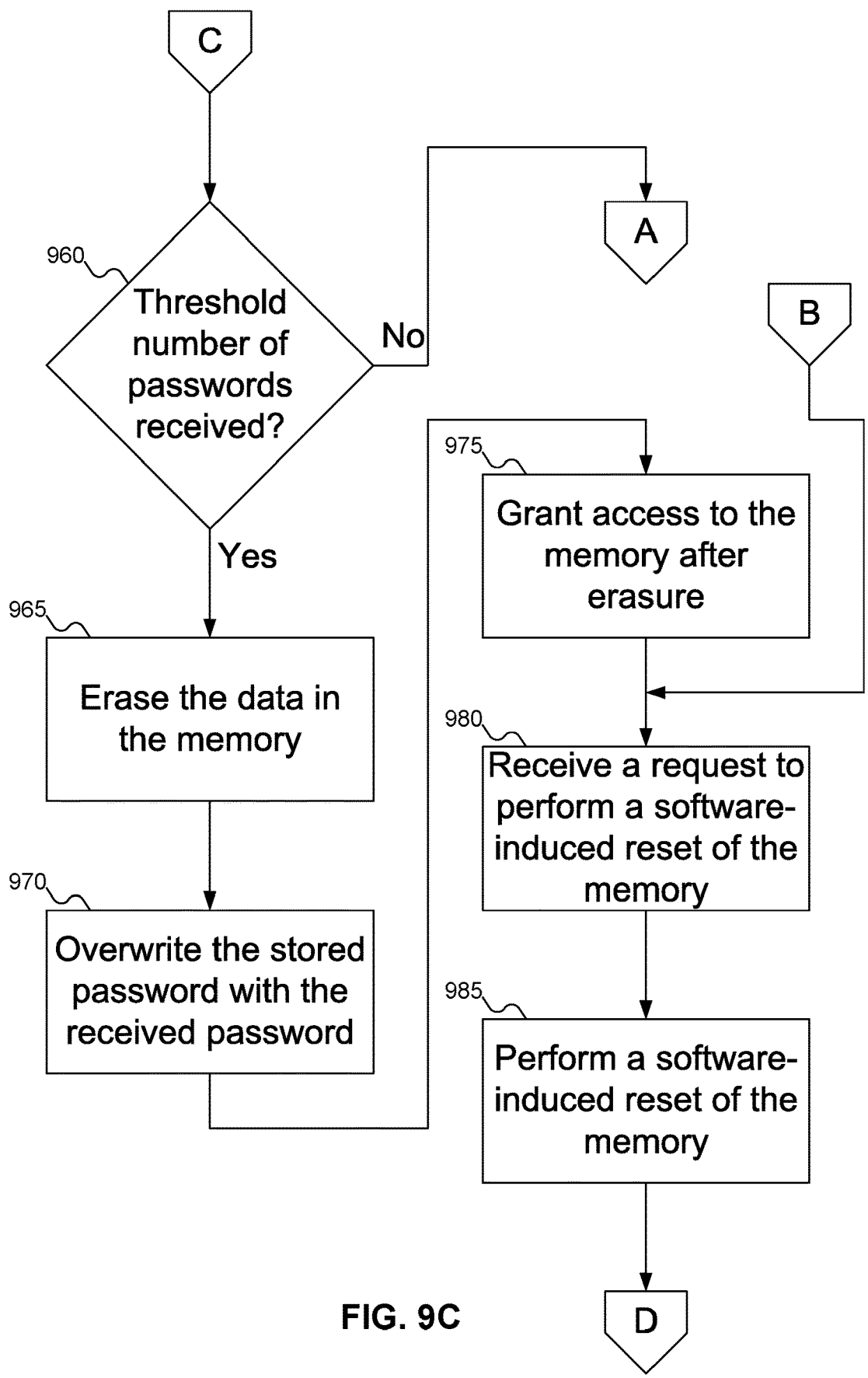

FIGS. 9A-9C show a flowchart of an example procedure for memory 145 of FIG. 1 to determine whether to grant memory controller 205 of FIG. 3 access to data or to erase the data, according to an embodiment of the inventive concept. In FIG. 9A, at block 905, memory 145 of FIG. 1 may receive a request to know if memory 145 of FIG. 1 is operating in secure mode or not. At block 910, memory 145 of FIG. 1 may send a signal to memory controller 205 of FIG. 3, indicating whether or not memory 145 of FIG. 1 is operating in secure mode. At block 915, memory 145 of FIG. 1 may receive from memory controller 205 of FIG. 3 a request to access memory 145 of FIG. 1.

At block 920, memory 145 of FIG. 1 may determine whether it is operating in secure mode or not. If memory 145 of FIG. 1 is not operating in secure mode, then at block 925 memory 145 of FIG. 1 may grant access to memory controller 205 of FIG. 3. Otherwise, at block 930, authentication logic 415 may access stored password 510 of FIG. 5 from password storage 355 of FIG. 3.

At block 935 (FIG. 9B), memory 145 of FIG. 1 may request password 505 of FIG. 5 from memory controller 205 of FIG. 3. At block 940, memory 145 of FIG. 1 may receive password 505 of FIG. 5 from memory controller 205 of FIG. 3. At block 945, comparator 430 of FIG. 4 may compare received password 505 of FIG. 5 with stored password 510 of FIG. 5.

At block 950, authentication logic 415 of FIG. 4 may determine result 515 of FIG. 5, indicating whether the comparison of received password 505 of FIG. 5 and stored password 510 of FIG. 5 indicated a match. If so, then at block 955, memory 145 of FIG. 1 may grant memory controller 205 of FIG. 3 access to memory 145 of FIG. 1.

At block 960 (FIG. 9C), assuming that received password 505 of FIG. 5 did not match stored password 510 of FIG. 5, authentication logic 415 of FIG. 4 may determine whether the threshold number of password comparisons has occurred. If not, then control returns to block 935 of FIG. 9B for memory 145 of FIG. 1 to request a new password from memory controller 205 of FIG. 3. Otherwise, at block 965 erase logic 435 of FIG. 4 may erase the data from data storage 310-345 of FIGS. 3-4. Then, at block 970, password write logic 440 of FIG. 4 may write received password 505 of FIG. 5 into password storage 355 of FIG. 3, after which at block 975 memory 145 of FIG. 1 may grant memory controller 205 of FIG. 3 access to memory 145 of FIG. 1.

At block 980, regardless of whether memory 145 of FIG. 1 granted memory controller 205 of FIG. 3 access to memory 145 of FIG. 3 with or without erasing the data in data storage 310-345 of FIGS. 3-4, at block 980 memory 145 of FIG. 1 may receive from memory controller 205 of FIG. 3 a signal to perform a software-induced reset, and at block 985 memory 145 of FIG. 1 may perform a software-induced reset, after which processing ends.

Figure 10:
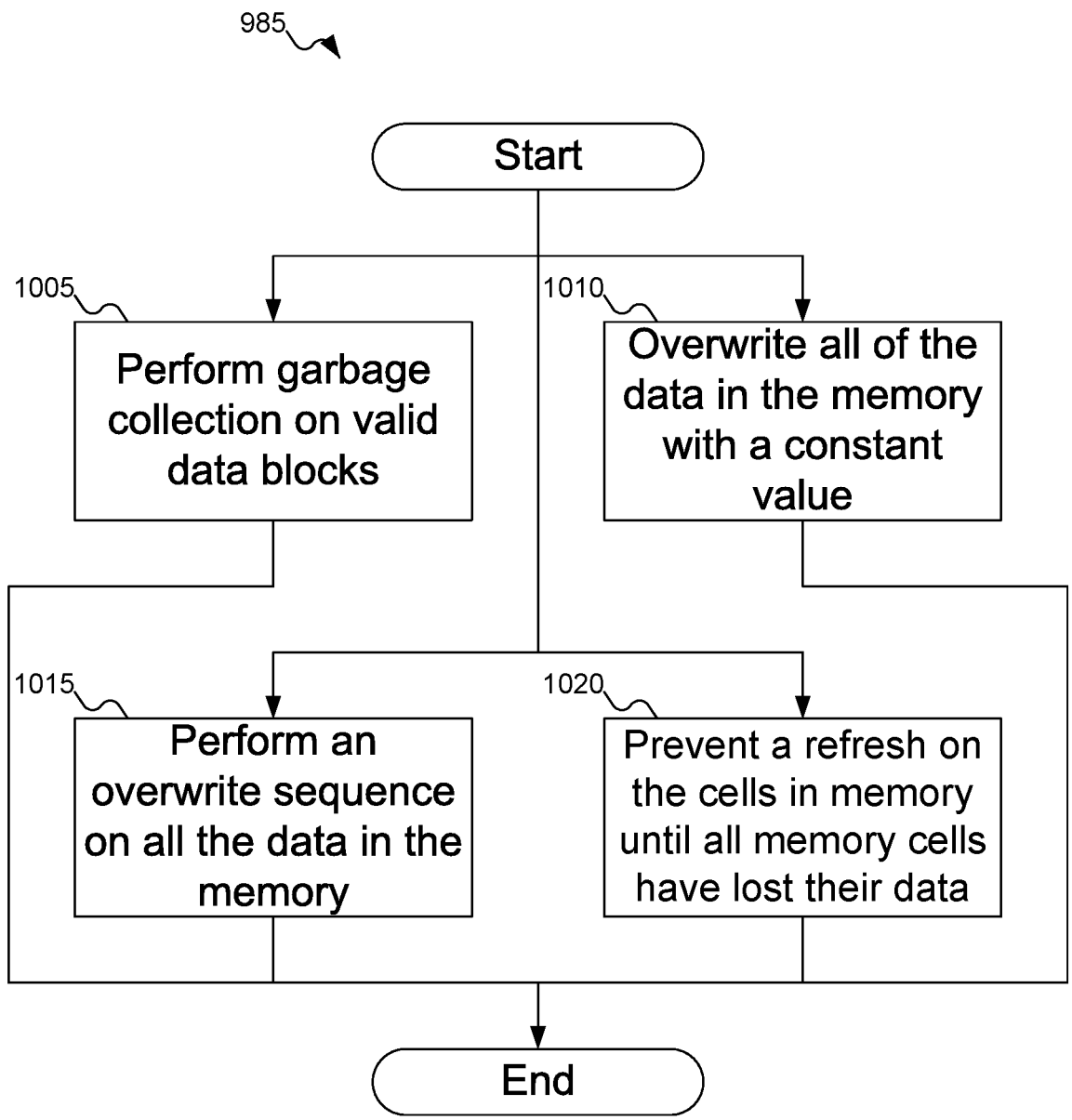
FIG. 10 shows a flowchart of an example procedure for the erase logic of FIG. 4 to erase data from the memory of FIG. 1, according to an embodiment of the inventive concept.

FIG. 10 shows a flowchart of an example procedure for erase logic 435 of FIG. 4 to erase data from memory 145 of FIG. 1, according to an embodiment of the inventive concept. In FIG. 10, at block 1005, erase logic 435 of FIG. 4 may perform garbage collection on blocks of memory that were used by the user. Alternatively, at block 1010, erase logic 435 of FIG. 4 may overwrite all of the data in memory 145 of FIG. 1 with a constant value. Alternatively, at block 1015, erase logic 435 of FIG. 4 may perform an overwrite sequence, such as to write all zeros, then all ones, then a random pattern, on all data in memory 145 of FIG. 1. Alternatively, at block 1020, erase logic 435 of FIG. 4 may prevent cells in memory 145 of FIG. 1 from being refreshed, until such time as memory 145 of FIG. 1 may guarantee that all stored data values have been lost.

In FIGS. 7A-10, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a memory (145), comprising:

a data storage (310, 315, 320, 325, 330, 335, 340, 345) for data for a first user;

a data read logic (405) to read data from the data storage (310, 315, 320, 325, 330, 335, 340, 345);

a data write logic (410) to write data to the data storage (310, 315, 320, 325, 330, 335, 340, 345);

a password storage (355) for a stored password (510);

a receiver (420) to receive a received password (505) from a memory controller (205);

a comparator (430) to compare the received password (505) with the stored password (510);

an erase logic (435) to erase the data in the data storage (310, 315, 320, 325, 330, 335, 340, 345) if the received password (505) differs from the stored password (510); and a block logic (425) to block access to the data storage (310, 315, 320, 325, 330, 335, 340, 345) from a memory controller (205) until after the comparator (430) completes operation, wherein the password is not used to encrypt data stored in the memory (145).

Statement 2. An embodiment of the inventive concept includes a memory (145) according to statement 1, wherein the block logic (425) is operative to block access to the data storage (310, 315, 320, 325, 330, 335, 340, 345) from the memory controller (205) until after the erase logic (435) completes operation.

Statement 3. An embodiment of the inventive concept includes a memory (145) according to statement 1, further comprising a password write logic (440) to write the received password (505) to the password storage (355).

Statement 4. An embodiment of the inventive concept includes a memory (145) according to statement 1, further comprising a Serial Presence Detect (SPD) (350) to specify whether the memory (145) is operating in a secure mode.

Statement 5. An embodiment of the inventive concept includes a memory (145) according to statement 4, wherein the block logic (425) permits the memory controller (205) to access the data storage (310, 315, 320, 325, 330, 335, 340, 345) without invoking the comparator (430) if the SPD (350) specifies that the memory (145) is not operating in the secure mode.

Statement 6. An embodiment of the inventive concept includes a memory (145) according to statement 1, further comprising a Vital Product Data (VPD) (160) to specify whether the memory (145) is operating in a secure mode.

Statement 7. An embodiment of the inventive concept includes a memory (145) according to statement 6, further comprising an Electronically Erasable Programmable Read Only Memory (EEPROM) (150) storing the VPD (160).

Statement 8. An embodiment of the inventive concept includes a memory (145) according to statement 6, wherein the block logic (425) permits the memory controller (205) to access the data storage (310, 315, 320, 325, 330, 335, 340, 345) without invoking the comparator (430) if the VPD (160) specifies that the memory (145) is not operating in the secure mode.

Statement 9. An embodiment of the inventive concept includes a memory (145) according to statement 1, wherein the erase logic (435) is operative to erase the data in the data storage (310, 315, 320, 325, 330, 335, 340, 345) if a threshold number (520) of received passwords (505) all differ from the stored password (510).

Statement 10. An embodiment of the inventive concept includes a memory (145) according to statement 1, wherein:

the memory (145) further comprises a second data storage (310, 315, 320, 325, 330, 335, 340, 345) to store a second data for a second user;

the data read logic (405) is operative to read the second data from the second data storage (310, 315, 320, 325, 330, 335, 340, 345);

the data write logic (410) is operative to write the second data to the second data storage (310, 315, 320, 325, 330, 335, 340, 345);

the password storage (355) is operative to store a second stored password (510);

the receiver (420) is operative to receive a second received password (505) from a second memory controller (620);

the comparator (430) is operative to compare the second received password (505) with the second stored password (510);

the erase logic (435) is operative to erase the second data in the second data storage (310, 315, 320, 325, 330, 335, 340, 345) if the second received password (505) differs from the second stored password (510); and the block logic (425) is operative to block access to the second data storage (310, 315, 320, 325, 330, 335, 340, 345) from the second memory controller (620) until after the comparator (430) completes operation.

Statement 11. An embodiment of the inventive concept includes a memory (145) according to statement 10, wherein the memory controller (205) is the second memory controller (205).

Statement 12. An embodiment of the inventive concept includes a memory (145) according to statement 1, wherein the memory (145) is drawn from a set including a volatile memory module, a non-volatile memory module, and any combination of volatile and non-volatile memory devices.

Statement 13. An embodiment of the inventive concept includes a memory (145) according to statement 1, further comprising a Register Clock Driver (RCD) (305) including the receiver (420), the comparator (430), the erase logic, and the block logic (425).

Statement 14. An embodiment of the inventive concept includes a memory (145) according to statement 13, wherein the RCD (305) further comprises the data read logic (405) and the data write logic (410).

Statement 15. An embodiment of the inventive concept includes a method, comprising:
 determining (705) that a memory (145) has reset;
 determining (710) whether the memory (145) is operating in a secure mode or a non-secure mode; and
 if the memory (145) is operating in the secure mode:
 selecting (720) a password (505) for a user;
 sending (725) the password (505) to the memory (145); and
 receiving (740, 745) access to the memory (145),
 wherein the password (505) is not used to encrypt data stored in the memory (145).

Statement 16. An embodiment of the inventive concept includes a method according to statement 15, further comprising, if the memory (145) is operating in the non-secure mode, receiving (715) access to the memory (145) without using a password (505).

Statement 17. An embodiment of the inventive concept includes a method according to statement 15, wherein sending (725) the password (505) to the memory (145) includes sending (725, 730, 745) the password (505) to the memory (145) a threshold number (520) of times.

Statement 18. An embodiment of the inventive concept includes a method according to statement 15, wherein receiving (740, 745) access to the memory (145) includes receiving (740) access to an erased memory (145).

Statement 19. An embodiment of the inventive concept includes a method according to statement 15, wherein receiving (740, 745) access to the memory (145) includes receiving (745) access to data stored in the memory (145).

Statement 20. An embodiment of the inventive concept includes a method according to statement 15, further comprising:
 measuring (750) an amount of time since the memory (145) reset; and
 if the amount of time since the memory (145) reset is greater than a threshold, sending (760) a software-induced reset to the memory (145).

Statement 21. An embodiment of the inventive concept includes a method according to statement 15, wherein the memory (145) is drawn from a set including a volatile memory module, a non-volatile memory module, and any combination of volatile and non-volatile memory devices.

Statement 22. An embodiment of the inventive concept includes a method according to statement 15, wherein the memory (145) is a first portion (605) of a memory (145) module, the first portion (605) allocated to a first user, the memory (145) module including a second portion (610) of memory (145) allocated to a second user.

Statement 23. An embodiment of the inventive concept includes a method according to statement 15, wherein selecting (720) a password (505) for a user includes generating (805) a random password (505).

Statement 24. An embodiment of the inventive concept includes a method according to statement 15, wherein selecting (720) a password (505) for a user includes selecting (810) the password (505) from a list of available passwords.

Statement 25. An embodiment of the inventive concept includes a method according to statement 15, wherein selecting (720) a password (505) for a user includes generating (815) the password (505) as a hash of an identifier for the user.

Statement 26. An embodiment of the inventive concept includes a method according to statement 15, wherein selecting (720) a password (505) for a user includes accessing (820) the password (505) from a Trusted Platform Module.

Statement 27. An embodiment of the inventive concept includes a method, comprising:
 sending (910) a signal from a memory (145) to a memory controller (205) that the memory (145) is operating in secure mode;
 receiving (940) a received password (505) from the memory controller (205);
 comparing (945) the received password (505) with a stored password (510); and
 if the received password (505) does not match the stored password (510):
 erasing (965) the memory (145); and
 providing (955, 975) the memory controller (205) access to the memory (145),
 wherein the password is not used to encrypt data stored in the memory (145).

Statement 28. An embodiment of the inventive concept includes a method according to statement 27, further comprising, if the received password (505) does not match the stored password (510), storing the received password (505) in the memory (145).

Statement 29. An embodiment of the inventive concept includes a method according to statement 27, wherein, if the received password (505) matches the stored password (510), providing (955) the memory controller (205) access to the memory (145).

Statement 30. An embodiment of the inventive concept includes a method according to statement 27, further comprising receiving (940, 960) and comparing (945, 950, 960) the received password (505) with a stored password (510) a threshold number (520) of times before erasing (965) the memory (145).

Statement 31. An embodiment of the inventive concept includes a method according to statement 27, further comprising:
 receiving (980) from the memory controller (205) a reset command; and
 resetting (985) the memory (145) responsive to the reset command.

Statement 32. An embodiment of the inventive concept includes a method according to statement 31, wherein resetting (985) the memory (145) responsive to the reset command includes performing (1005) garbage collection on all data in the memory (145).

Statement 33. An embodiment of the inventive concept includes a method according to statement 31, wherein resetting (985) the memory (145) responsive to the reset command includes performing (1015) an overwrite sequence on all data in the memory (145).

Statement 34. An embodiment of the inventive concept includes a method according to statement 31, wherein resetting (985) the memory (145) responsive to the reset command includes overwriting (1010) all data in the memory (145) with a constant value.

Statement 35. An embodiment of the inventive concept includes a method according to statement 31, wherein resetting (985) the memory (145) responsive to the reset command includes preventing (1020) a refresh on all data in the memory (145) until all data in the memory (145) is no longer stored in the memory (145).

Statement 36. An embodiment of the inventive concept includes a method according to statement 27, wherein sending (910) a signal from a memory (145) to a memory controller (205) that the memory (145) is operating in secure mode includes receiving (905) a request from the memory controller (205) as to whether the memory (145) is operating in secure mode.

Statement 37. An embodiment of the inventive concept includes a method according to statement 27, wherein receiving (940) a received password (505) from the memory controller (205) includes requesting (935) the password from the memory controller (205).

Statement 38. An embodiment of the inventive concept includes a method according to statement 27, wherein the memory (145) is drawn from a set including a volatile memory module, a non-volatile memory module, and any combination of volatile and non-volatile memory devices.

Statement 39. An embodiment of the inventive concept includes a method according to statement 27, wherein the memory (145) is a first portion (605) of a memory (145) module, the first portion (605) allocated to a first user, the memory (145) module including a second portion (610) of memory (145) allocated to a second user.

Statement 40. An embodiment of the inventive concept includes an article, comprising a tangible storage medium, the tangible storage medium having stored thereon non-transitory instructions that, when executed by a machine, result in:
  determining (705) that a memory (145) has reset;
  determining (710) whether the memory (145) is operating in a secure mode or a non-secure mode; and
  if the memory (145) is operating in the secure mode:
  selecting (720) a password (505) for a user;
  sending (725) the password (505) to the memory (145); and
  receiving (740, 745) access to the memory (145),
  wherein the password (505) is not used to encrypt data stored in the memory (145).

Statement 41. An embodiment of the inventive concept includes an article according to statement 40, the tangible storage medium having stored thereon further non-transitory instructions that, when executed by the machine, result in, if the memory (145) is operating in the non-secure mode, receiving (715) access to the memory (145) without using a password (505).

Statement 42. An embodiment of the inventive concept includes an article according to statement 40, wherein sending (725) the password (505) to the memory (145) includes sending (725, 730, 745) the password (505) to the memory (145) a threshold number (520) of times.

Statement 43. An embodiment of the inventive concept includes an article according to statement 40, wherein receiving (740, 745) access to the memory (145) includes receiving (740) access to an erased memory (145).

Statement 44. An embodiment of the inventive concept includes an article according to statement 40, wherein receiving (740, 745) access to the memory (145) includes receiving (745) access to data stored in the memory (145).

Statement 45. An embodiment of the inventive concept includes an article according to statement 40, the tangible storage medium having stored thereon further non-transitory instructions that, when executed by the machine, result in:
  measuring (750) an amount of time since the memory (145) reset; and
  if the amount of time since the memory (145) reset is greater than a threshold, sending (760) a software-induced reset to the memory (145).

Statement 46. An embodiment of the inventive concept includes an article according to statement 40, wherein the memory (145) is drawn from a set including a volatile memory module, a non-volatile memory module, and any combination of volatile and non-volatile memory devices.

Statement 47. An embodiment of the inventive concept includes an article according to statement 40, wherein the memory (145) is a first portion (605) of a memory (145) module, the first portion (605) allocated to a first user, the memory (145) module including a second portion (610) of memory (145) allocated to a second user.

Statement 48. An embodiment of the inventive concept includes an article according to statement 40, wherein selecting (720) a password (505) for a user includes generating (805) a random password (505).

Statement 49. An embodiment of the inventive concept includes an article according to statement 40, wherein selecting (720) a password (505) for a user includes selecting (810) the password (505) from a list of available passwords.

Statement 50. An embodiment of the inventive concept includes an article according to statement 40, wherein selecting (720) a password (505) for a user includes generating (815) the password (505) as a hash of an identifier for the user.

Statement 51. An embodiment of the inventive concept includes an article according to statement 40, wherein selecting (720) a password (505) for a user includes accessing (820) the password (505) from a Trusted Platform Module.

Statement 52. An embodiment of the inventive concept includes an article, comprising a tangible storage medium, the tangible storage medium having stored thereon non-transitory instructions that, when executed by a machine, result in:
  sending (910) a signal from a memory (145) to a memory controller (205) that the memory (145) is operating in secure mode;
  receiving (940) a received password (505) from the memory controller (205);
  comparing (945) the received password (505) with a stored password (510); and
  if the received password (505) does not match the stored password (510):
  erasing (965) the memory (145); and
  providing (955, 975) the memory controller (205) access to the memory (145),
  wherein the password is not used to encrypt data stored in the memory (145).

Statement 53. An embodiment of the inventive concept includes an article according to statement 52, the tangible storage medium having stored thereon further non-transitory instructions that, when executed by the machine, result in, if the received password (505) does not match the stored password (510), storing the received password (505) in the memory (145).

Statement 54. An embodiment of the inventive concept includes an article according to statement 52, wherein, if the received password (505) matches the stored password (510), providing (955, 975) the memory controller (205) access to the memory (145).

Statement 55. An embodiment of the inventive concept includes an article according to statement 52, the tangible storage medium having stored thereon further non-transitory instructions that, when executed by the machine, result in receiving (940, 960) and comparing (945, 950, 960) the received password (505) with a stored password (510) a threshold number (520) of times before erasing (965) the memory (145).

Statement 56. An embodiment of the inventive concept includes an article according to statement 52, the tangible storage medium having stored thereon further non-transitory instructions that, when executed by the machine, result in:
receiving (980) from the memory controller (205) a reset command; and
resetting (985) the memory (145) responsive to the reset command.

Statement 57. An embodiment of the inventive concept includes an article according to statement 56, wherein resetting (985) the memory (145) responsive to the reset command includes performing (1005) garbage collection on all data in the memory (145).

Statement 58. An embodiment of the inventive concept includes an article according to statement 56, wherein resetting (985) the memory (145) responsive to the reset command includes performing (1015) an overwrite sequence on all data in the memory (145).

Statement 59. An embodiment of the inventive concept includes an article according to statement 56, wherein resetting (985) the memory (145) responsive to the reset command includes overwriting (1010) all data in the memory (145) with a constant value.

Statement 60. An embodiment of the inventive concept includes an article according to statement 56, wherein resetting (985) the memory (145) responsive to the reset command includes preventing (1020) a refresh on all data in the memory (145) until all data in the memory (145) is no longer stored in the memory (145).

Statement 61. An embodiment of the inventive concept includes an article according to statement 52, wherein sending (910) a signal from a memory (145) to a memory controller (205) that the memory (145) is operating in secure mode includes receiving (905) a request from the memory controller (205) as to whether the memory (145) is operating in secure mode.

Statement 62. An embodiment of the inventive concept includes an article according to statement 52, wherein receiving (940) a received password (505) from the memory controller (205) includes requesting (935) the password from the memory controller (205).

Statement 63. An embodiment of the inventive concept includes an article according to statement 52, wherein the memory (145) is drawn from a set including a volatile memory module, a non-volatile memory module, and any combination of volatile and non-volatile memory devices.

Statement 64. An embodiment of the inventive concept includes an article according to statement 52, wherein the memory (145) is a first portion (605) of a memory (145) module, the first portion (605) allocated to a first user, the memory (145) module including a second portion (610) of memory (145) allocated to a second user.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A memory, comprising:
a data storage for data for a first user;
a data read logic to read data from the data storage;
a data write logic to write data to the data storage;
a password storage for a stored password;
a receiver to receive a received password from the memory controller;
a comparator to compare the received password with the stored password;
an erase logic to erase the data in the data storage based on a comparison of the received password with the stored password by the comparator; and
a block logic to block access to the data storage from a memory controller until after the comparator completes operation, wherein the password is not used to encrypt data stored in the memory,
wherein the received password is stored in the password storage based on the received password not matching toe stored password by the comparator, and
wherein when the memory is in the secure mode the entirety of the memory is in the secure mode, and when the memory is in the non-secure mode, the entirety of the memory is in the non-secure mode.

2. A memory according to claim 1, wherein the block logic is operative to block access to the data storage from the memory controller until after the erase logic completes operation.

3. A memory according to claim 1, further comprising a password write logic to write the received password to the password storage.

4. A memory according to claim 1, further comprising a Serial Presence Detect (SPD) to specify whether the memory is operating in the secure mode.

5. A memory according to claim 4, wherein based at least in part on the SPD, the block logic permits the memory controller to access the data storage without invoking the comparator.

6. A memory according to claim 1, wherein based at least in part on a threshold number of received passwords all differing from the stored password, the erase logic is operative to erase the data in the data storage.

7. A memory according to claim 1, further comprising a Register Clock Driver (RCD) including the receiver, the comparator, the erase logic, and the block logic.

8. A memory according to claim 1, wherein the block logic and the erase logic are operative to prevent access to the data for the first user after power is interrupted and would cause a volatile memory to lose the data.

9. A memory according to claim 1, wherein the memory is in exactly one of a secure mode or a non-secure mode.

10. A memory according to claim 1, wherein the received password is generated by the memory controller.

11. A memory according to claim 1, wherein the memory includes a Non-Volatile Dual In-Line Memory Module (NVDIMM) used instead of a volatile memory.

12. A method, comprising:
   determining that a memory has reset;
   receiving a signal from the memory at a memory controller that the memory is operating in a secure mode or a non-secure mode; and
   based at least in part on the memory operating in the secure mode:
      selecting a password for a user;
      sending the password to the memory; and
      receiving access to the memory,
   wherein the password is not used to encrypt data stored in the memory,
   wherein the password is stored in the memory based at least in part on the password not matching a stored password in the memory, and
   wherein, when the memory is in the secure mode the entirety of the memory is in the secure mode, and when the memory is in the non-secure mode, the entirety of the memory is in the non-secure mode.

13. A method according to claim 12, further comprising, based at least in part on the memory operating in the non-secure mode, receiving access to the memory without using the password.

14. A method according to claim 13, wherein receiving access to the memory without using the password includes receiving access to the memory without performing any authentication.

15. A method according to claim 12, wherein sending the password to the memory includes sending the password to the memory a threshold number of times.

16. A method according to claim 12, wherein receiving access to the memory includes based at least in part on the password not matching a second password, receiving access to an erased memory.

17. A method according to claim 12, further comprising:
   measuring an amount of time since the memory reset; and
   based at least in part on the amount of time since the memory reset, sending a software-induced reset to the memory, requiring the memory controller to authenticate to access data in the memory after the software-induced reset.

18. A method according to claim 12, wherein the memory includes a Non-Volatile Dual In-Line Memory Module (NVDIMM) used instead of a volatile memory.

19. A method according to claim 18, wherein the method is operative to prevent access to data in the memory after power is interrupted and would cause the volatile memory to lose the data.

20. A method according to claim 12, wherein receiving a signal from the memory at a memory controller that the memory is operating in a secure mode or a non-secure mode includes the memory is in exactly one of the secure mode or the non-secure mode.

21. A method according to claim 12, wherein selecting a password for a user includes generating the password for a user by the memory controller.

22. A method, comprising:
   sending a signal from a memory to a memory controller that the memory is operating in a secure mode, wherein the memory supports the secure mode or a non-secure mode;
   receiving a received password from the memory controller;
   comparing the received password with a stored password; and
   based at least in part on the received password not matching the stored password:
      erasing the memory;
      providing the memory controller access to the memory; and
      storing the received password in the memory,
   wherein the password is not used to encrypt data stored in the memory,
   wherein when the memory is in the secure mode the entirety of the memory is in the secure mode, and when the memory is in the non-secure mode, the entirety of the memory is in the non-secure mode.

23. A method according to claim 22, wherein, based at least in part on the received password matching the stored password, providing the memory controller access to the memory.

24. A method according to claim 22, further comprising receiving and comparing the received password with a stored password a threshold number of times before erasing the memory.

25. A method according to claim 22, further comprising:
   receiving from the memory controller a reset command; and
   resetting the memory responsive to the reset command.

26. A method according to claim 22, wherein sending a signal from a memory to a memory controller that the memory is operating in secure mode includes receiving a request from the memory controller as to whether the memory is operating in secure mode.

27. A method according to claim 22, wherein receiving a received password from the memory controller includes requesting the password from the memory controller.

28. A method according to claim 22, wherein the memory is in exactly one of the secure mode or the non-secure mode.

29. A method according to claim 22, wherein the method is operative to prevent access to a data in the memory after power is interrupted and would cause the volatile memory to lose the data.

30. A method according to claim 22, wherein receiving a received password from the memory controller includes the memory controller generating the password for a user.

31. A method according to claim 22, wherein:
   the memory includes a Non-Volatile Dual In-Line Memory Module (NVDIMM) used instead of a volatile memory, and
   the memory provides access to the memory without any authentication when the memory is operating in non-secure mode.

* * * * *